Jan. 13, 1925.

J. E. POINTON

DOUGH DIVIDING MACHINE

Filed Jan. 2, 1924

1,522,594

Inventor
J. E. Pointon
By Marks & Clerk Attys

Patented Jan. 13, 1925.

1,522,594

UNITED STATES PATENT OFFICE.

JOHN EDWARD POINTON, OF LONDON, ENGLAND, ASSIGNOR TO BAKER-PERKINS COMPANY, INCORPORATED, OF WHITE PLAINS, NEW YORK.

DOUGH-DIVIDING MACHINE.

Application filed January 2, 1924. Serial No. 684,038.

*To all whom it may concern:*

Be it known that I, JOHN EDWARD POINTON, a British subject, residing at Kingsway House, Kingsway, London, W. C. 2, England, have invented certain new and useful Improvements Relating to Dough-Dividing Machines, of which the following is a specification.

This invention relates to dough dividing machines, commonly known as dividers, for bread making and like purposes, and of the type comprising a hopper with a feed roll or rolls therein from which the dough descends to a main box or chamber where it is separated by a reciprocating ram, or ram and separating knife, from the mass in the hopper and carried forward to the series of division boxes to give the required loaf or like portions.

The object of this invention is to ensure great uniformity and accuracy in the weight of the divided dough portions, without punishment or deleterious treatment of the dough in passing through the divider.

The invention comprises the arrangement in combination of the feed roll or rolls in the hopper and the reciprocating ram in the main box or separating chamber beneath the hopper, so that on the forward or inward stroke of the said ram and during the separation of the dough and its compression within the said main box, a by-pass is provided through which such entrapped or pocketed air or gas as would adversely affect accurate and uniform division is expelled or returned to the hopper.

The invention further comprises provision for the ready escape of such expelled air or gas without passing through the mass of dough in the hopper, and of means for the adjustment of the size or extent of the by-pass aforesaid.

Referring to the accompanying sheet of explanatory drawings:—

Figure 1:
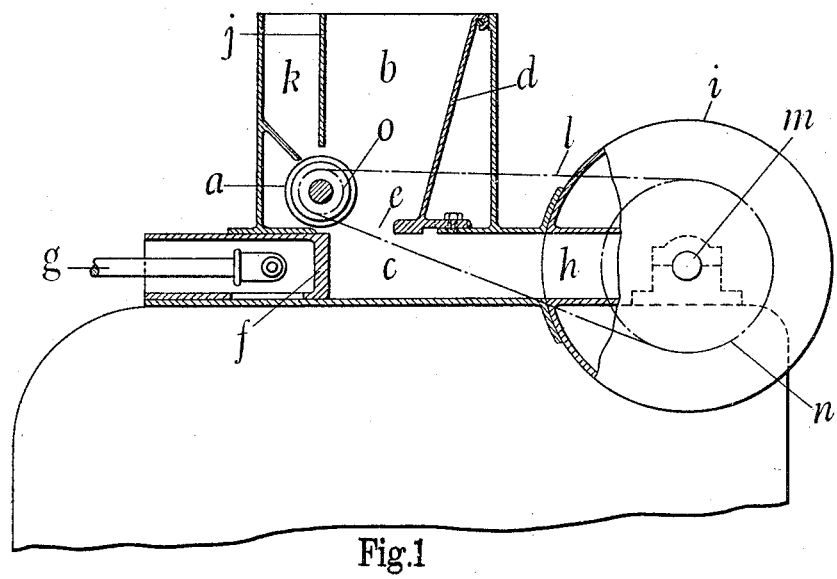
Figure 2:
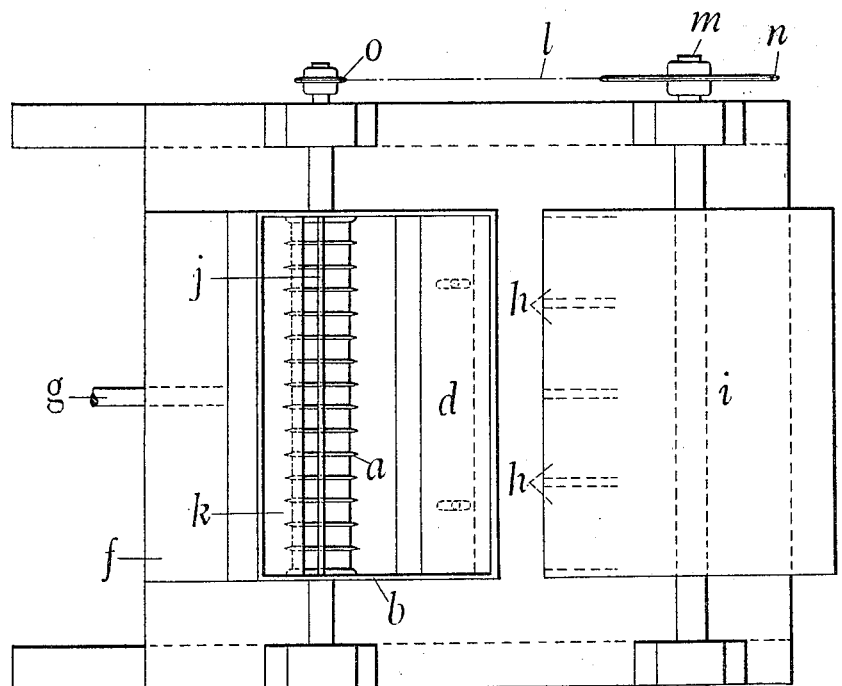

Figure 1 is a sectional side elevation and Figure 2 a plan representing a sufficient portion of a dough dividing machine to illustrate the application of the invention thereto.

The same reference letters in the two views indicate the same parts.

In the said illustrated application of the invention, a feed roll $a$ is mounted at one side of the lower part of the interior of the hopper $b$, adjacent the main box or separating chamber $c$ formed or arranged beneath the hopper. On the side of the hopper opposite the feed roll $a$, which is rotated either continuously or intermittently in any convenient manner, there is disposed an adjustable hinged or other plate $d$ whereby the width of the aperture or space $e$ between the periphery of the roll $a$ and the said plate may be adjusted or regulated to suit varying natures or classes of dough and varying rates of operation. Through the said adjustable space or aperture the dough passes, under the combined action of gravity and the feeding effect imparted by the roll, to the said main box or separating chamber $c$.

The position of the feed roll $a$ with respect to the ram $f$ which reciprocates, under the action of the known dead weight and cam drive operating through the rod $g$, in the main box $c$, is such that in the early part of each forward or pressure stroke the inner end of the ram passes beyond the operative side of the roll and thereby substantially cuts out its feed action, though the roll may continue its rotation. But during the period of each forward or inward stroke of the ram when it passes from such point of cut off of the feed roll action to the edge of the adjustable hopper plate $d$, the aperture $e$ aforesaid serves as a by-pass through which such air or gas as would form pockets and adversely affect the uniform division of the dough by the boxes or chambers as $h$ of the rotatable head or drum $i$, is expelled therefrom under the pressure set up by the advance of the ram.

Above the feed roll $a$ there is provided in the hopper $b$ a further plate $j$, preferably parallel with the adjacent side of the hopper, which provides for the free escape of the aforesaid expelled air or gas, by way of the flue or channel $k$ formed between the said plate and the adjacent side of the hopper.

The expulsion of air and gas aforesaid is only effected to the extent necessary to avoid irregular division without harsh or deleterious treatment of the dough or adversely affecting its subsequent proving or fermentation.

A small roll may be arranged with the adjustable plate $d$ disposed opposite the main or feed roll $a$, and other modifications may be made in the application of the invention to meet varying services or requirements.

In the illustrated example the roll $a$ is provided with thin flange like projections to give a better grip or hold on the dough for feeding purposes; they serve also to open or indent the dough and thereby provide for the escape of superfluous gases of fermentation.

The roll $a$ is preferably driven by chain $l$ from the shaft or spindle $m$ of the division box head or drum $i$; the said spindle receives intermittent rotary movements in the usual manner of such dough dividing machines, and thus the movements of the roll $a$ will be likewise intermittent and in unison with the movements of the division head $i$. The peripheral speed of roll $a$ may be adjusted, to suit the nature of the dough to be divided, by changing the ratio between the diameters of the respective wheels $n$ and $o$ which engage the aforesaid chain $l$.

Having thus described my invention what I claim as new and desire to secure by Letters Patent is:—

1. In dough dividing machines, the combination comprising a hopper, a feed roll in said hopper, a chamber beneath said hopper and feed roll, a reciprocating ram in said chamber, means whereby on the compression stroke of said ram a by-pass is provided through which air or gas entrapped in the dough in said chamber is returned to the hopper, and means for varying the width of the said by-pass, as set forth.

2. In dough dividing machines, the combination comprising a hopper, a feed roll in said hopper, a chamber beneath said hopper and feed roll, a reciprocating ram in said chamber, means whereby on the compression stroke of said ram a by-pass is provided through which air or gas entrapped in the said chamber is returned to the hopper, means for varying the width of the said by-pass and means whereby such returned air or gas can escape without passing through the mass of dough in the hopper, as set forth.

In testimony whereof I have signed my name to this specification.

JOHN EDWARD POINTON.